United States Patent
Bonhôte et al.

(10) Patent No.: US 8,673,161 B2
(45) Date of Patent: Mar. 18, 2014

(54) STRUCTURE FORMATION USING METAL DEPOSITED ON A RIE-ABLE SEEDLAYER

(75) Inventors: Christian R. Bonhôte, San Jose, CA (US); Jeffrey S. Lille, Sunnyvale, CA (US); Ricardo Ruiz, San Bruno, CA (US)

(73) Assignee: HGST Netherlands B.V., Amsterdam (NL)

( * ) Notice: Subject to any disclaimer, the term of this patent is extended or adjusted under 35 U.S.C. 154(b) by 1204 days.

(21) Appl. No.: 12/345,457

(22) Filed: Dec. 29, 2008

(65) Prior Publication Data

US 2010/0163520 A1 Jul. 1, 2010

(51) Int. Cl.
- *B44C 1/22* (2006.01)
- *B23P 15/00* (2006.01)
- *C03C 25/00* (2006.01)
- *C23F 1/00* (2006.01)
- *G11B 5/127* (2006.01)
- *H04R 31/00* (2006.01)

(52) U.S. Cl.
USPC ............ 216/22; 216/39; 216/40; 29/603.01

(58) Field of Classification Search
USPC .......................................... 206/22
See application file for complete search history.

(56) References Cited

U.S. PATENT DOCUMENTS

| | | | | |
|---|---|---|---|---|
| 4,375,390 | A | * | 3/1983 | Anderson et al. ........ 204/192.32 |
| 5,132,775 | A | * | 7/1992 | Brighton et al. .............. 257/750 |
| 5,654,232 | A | * | 8/1997 | Gardner ........................ 438/661 |
| 7,143,505 | B2 | * | 12/2006 | Sato ............................ 29/603.16 |
| 2006/0102956 | A1 | * | 5/2006 | Kamarajugadda et al. ... 257/359 |

* cited by examiner

Primary Examiner — Binh X Tran
Assistant Examiner — Thomas Pham
(74) Attorney, Agent, or Firm — Patterson & Sheridan, LLP

(57) ABSTRACT

Methods for fabricating a device component are provided. A substrate comprising a RIE stop layer, an oxide layer formed on the RIE stop layer, and a RIE-able layer formed on the oxide layer may be provided. A resist layer may be patterned on the RIE-able layer. A metal layer may be formed on portions of the RIE-able layer that are not covered by the resist layer. The resist layer may be removed and an RIE performed to remove exposed portions of the RIE-able layer and portions of the oxide layer beneath the exposed portions of the RIE-able layer. Thereafter, the metal layer may be removed, and the component may be formed in an opening in the oxide layer formed during the RIE.

22 Claims, 15 Drawing Sheets

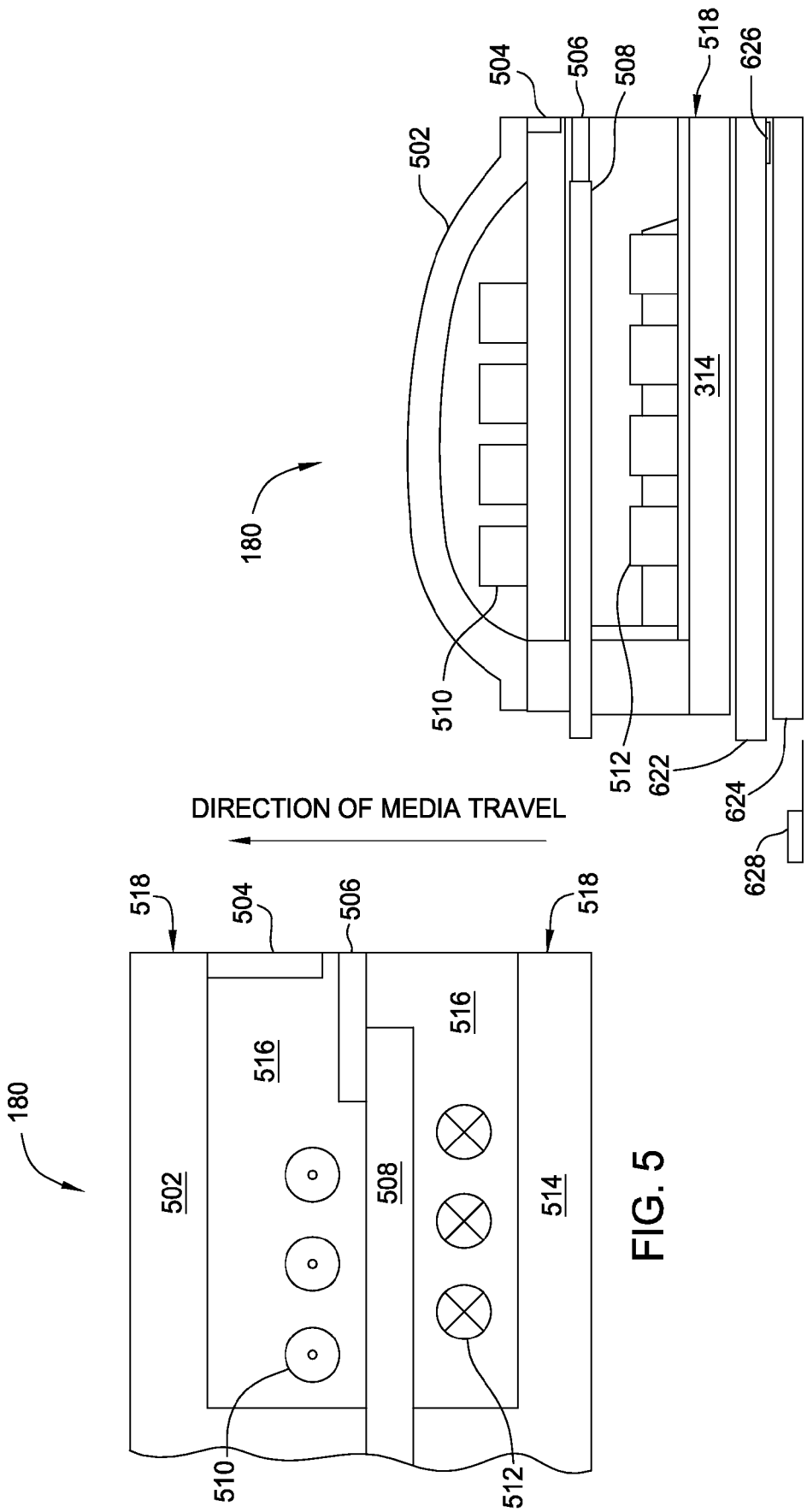

STRUCTURE FORMATION USING METAL DEPOSITED ON A RIE-ABLE SEEDLAYER

BACKGROUND OF THE INVENTION

1. Field of the Invention

Embodiments of the present invention generally relate to a fabrication of devices, and more specifically to forming device components with precise dimensions.

2. Description of the Related Art

Magnetic disk drive based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly, which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

When the slider rides on the air bearing, write and read heads are employed for writing magnetic impressions to and reading magnetic signal fields from the rotating disk. The read and write heads are connected to processing circuitry that operates according to a computer program to implement the writing and reading functions. A write head typically employs ferromagnetic pole pieces which are capable of carrying flux signals for the purpose of writing magnetic impressions into a track on a magnetic medium, such as a rotating magnetic disk. A coil layer is embedded in an insulation stack which is located between the first and second pole pieces. Processing circuitry digitally energizes the write coil which induces flux into the first and second pole pieces so that flux signals at the ABS write the magnetic impressions or bits into the track of the rotating disk.

To achieve the high areal densities required by the data storage industry, the magnetic heads are made with commensurately smaller dimensions. For example, the some magnetic head components may have a feature size of less than 100 nm. However, as the magnetic heads are made smaller, the likelihood of fabrication defects increases, which may result components of the magnetic heads being formed with undesired dimensions. The dimensions of the components may be crucial to the proper functioning of the magnetic heads.

SUMMARY OF THE INVENTION

Embodiments of the present invention generally relate to a fabrication of devices, and more specifically to forming device components with precise dimensions. One embodiment of the invention provides a method for fabricating a component. The method generally comprises providing a substrate comprising a Reactive Ion Etching (RIE) stop layer, an oxide layer formed on the RIE stop layer, and a Reactive Ion Etchable (RIE-able) layer formed on the oxide layer, patterning a resist layer on the RIE-able layer, and forming a metal layer on portions of the RIE-able layer that are not covered by the resist layer via electrodeposition. The method further comprises removing the resist layer, wherein removing the resist layer exposes a portion of the RIE-able layer, performing RIE to remove exposed portions of the RIE-able layer and portions of the oxide layer beneath the exposed portions of the RIE-able layer, removing the metal layer, and forming the component in an opening in the oxide layer formed during the RIE.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5 and 6 illustrate more detailed cross sectional views of magnetic heads according to embodiments of the invention.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Figure 1:
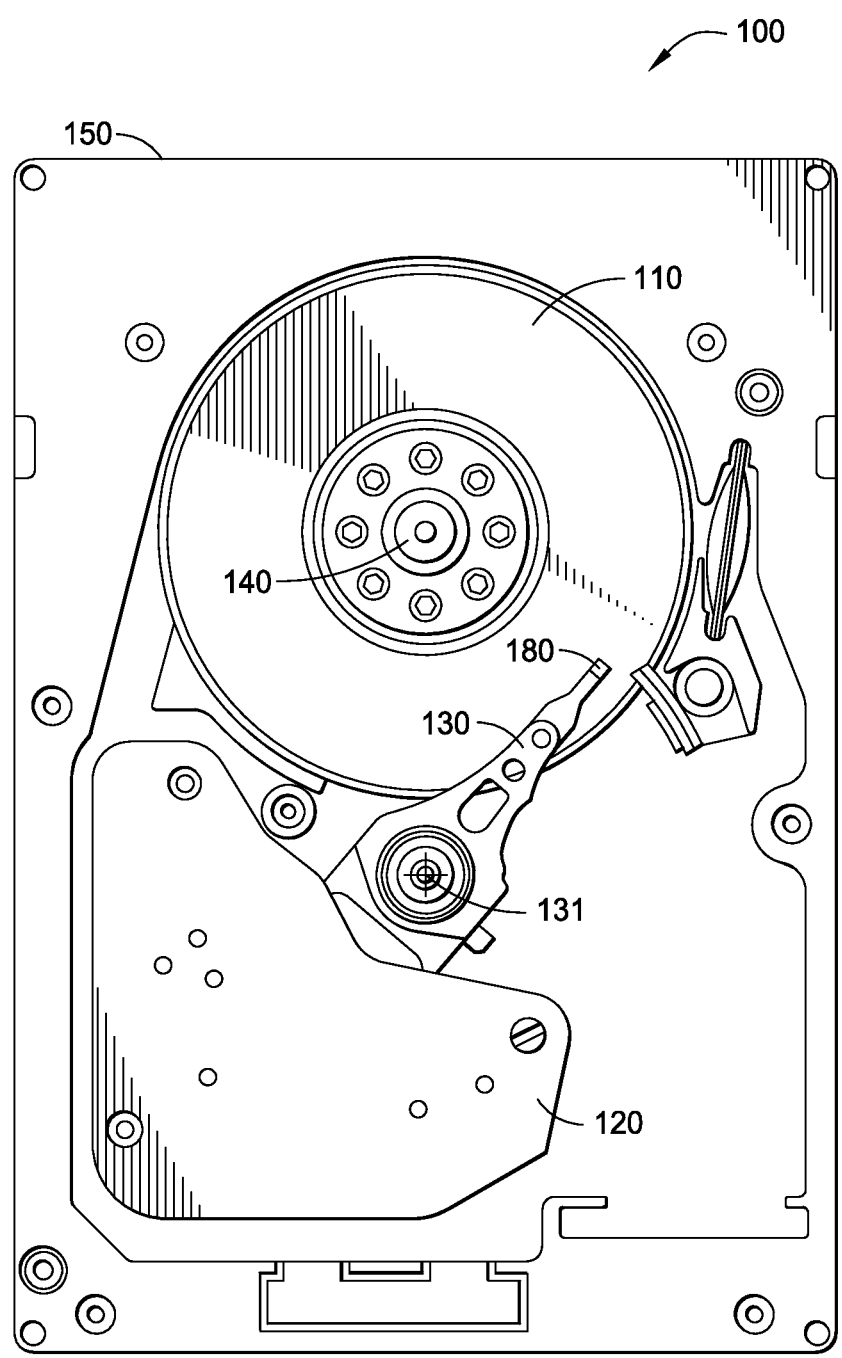
FIG. 1 illustrates an exemplary hard disk drive according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may contain circular tracks of data on both the top and bottom surfaces of the disk. An electromagnetic head, for example head 180, may be positioned on a track. As each disk spins, data may be written and read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

Figure 2:
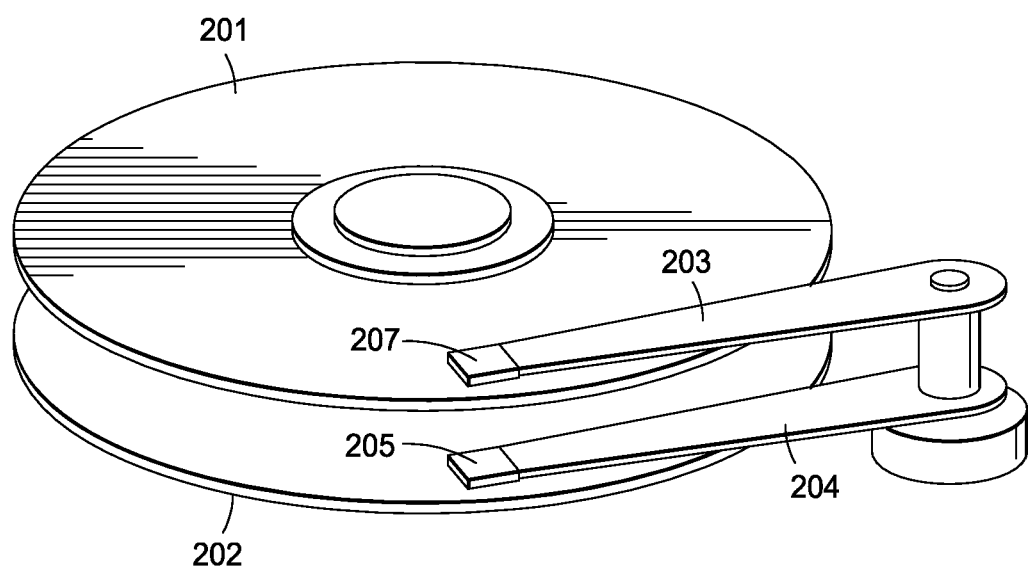
FIG. 2 illustrates a pair of magnetic disks and associated read/write heads according to an embodiment of the invention.

As described above, a plurality of magnetic disks may be stacked vertically in HDD 100. Each disk may have read and write tracks on each side of the disk. Therefore, electromagnetic heads may be placed on both sides of the disk. FIG. 2 illustrates two magnetic disks 201 and 202 that are stacked vertically. Actuator arms 203 and 204 may access data tracks on disks 201 and 202. As illustrated, actuator arm 203 may be coupled with electromagnetic head 207 to access data tracks on the top face of disk 201.

Actuator arm 204 may contain head 205. Head 205 may be configured to access data tracks on the bottom face of disk 201 (not illustrated) and on the top face of disk 202 (illustrated). While two magnetic disks are illustrated in FIG. 2, one skilled in the art will recognize that any number of magnetic disks may be vertically stacked with interleaving actuator arms providing heads to access the top and bottom faces of the disks.

Referring back to FIG. 1, each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 3:
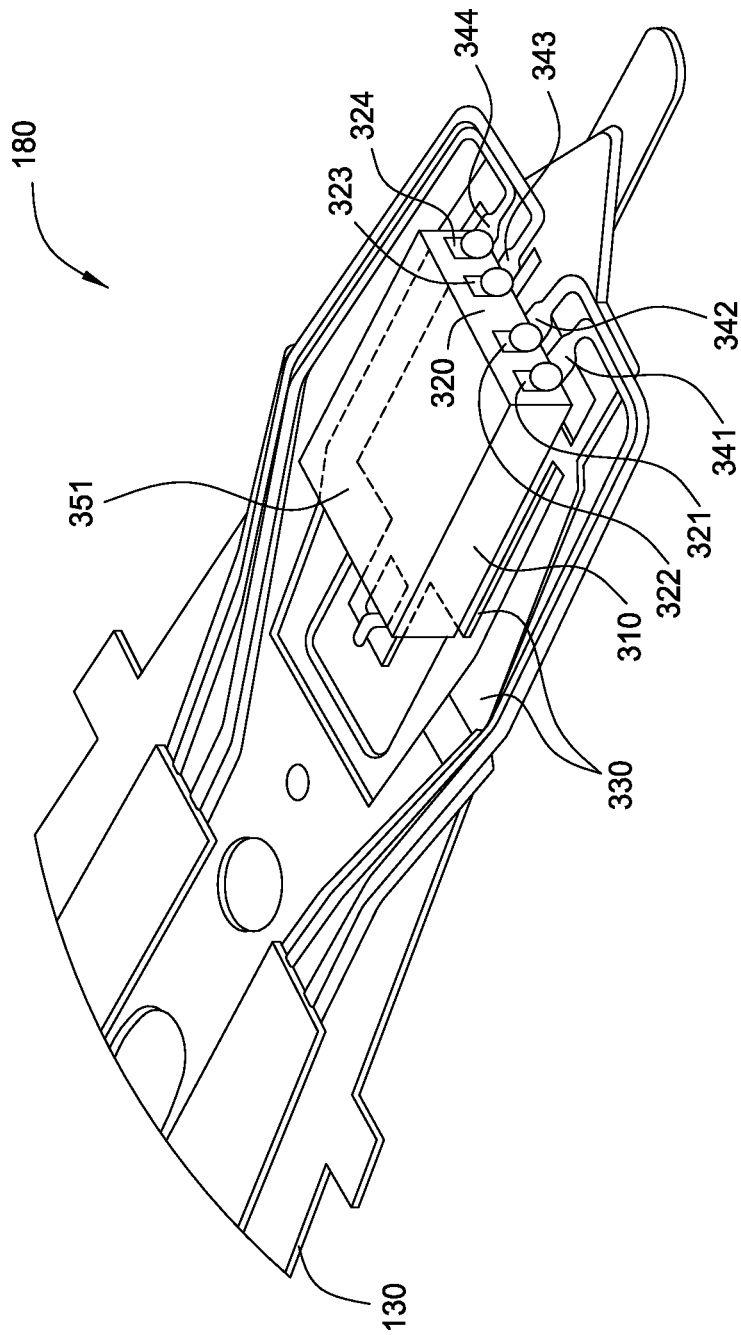
FIG. 3 illustrates a detailed view of a magnetic head according to an embodiment of the invention.

FIG. 3 illustrates a more detailed view of an electromagnetic head assembly 180, according to an embodiment of the invention. As illustrated in FIG. 3, head 180 may comprise a slider 310 having a magnetic head portion 320 formed on the slider 310. Head 180 may be mechanically affixed to a flexure 330 of the actuator arm 130, as illustrated in FIG. 3. In this respect, when the slider glides or flies over the magnetic disk, the airbearing surface 351 may be directly above the magnetic disk surface Magnetic head portion 320 may include a one or more write sensor pads and one or more read sensor pads. For example, two write sensor pads 321 and 322, and two read sensor pads 323 and 324 are illustrated in FIG. 3.

Each of write sensor pads 321 and 322, and read sensor pads 323 and 324 may be coupled with corresponding suspension leads 341-344, as illustrated in FIG. 3. Suspension leads 341-344 may be configured to carry an electric current to and from the write sensor pads and the read sensor pads.

Figure 4:
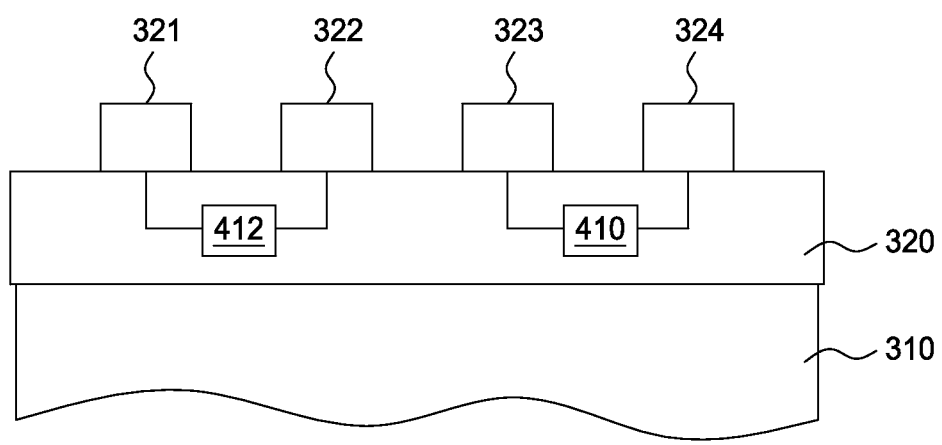
FIG. 4 illustrates a cross sectional view of a magnetic head according to an embodiment of the invention.

FIG. 4 illustrates a cross sectional view of head 180, in a plane parallel to the disk surface 110 (FIG. 1), according to an embodiment of the invention. As discussed above, head 180 may include a magnetic head portion 320 formed on a slider 310. Magnetic head portion 320 includes write pads 321 and 322, and read sensor pads 323 and 324. The read sensor pads 323 and 324 may be electrically coupled with a read sensor 410, as illustrated in FIG. 4. In one embodiment of the invention, read sensor 410 may be a spin valve. However, any other reasonable read sensor may also be used. The write pads 321 and 322 may be electrically coupled with a write head 412. Both read sensor 410 and write head 412 may be constructed in head 180 such that they are in close proximity of the magnetic disk when the slider 310 glides or flies over a magnetic disk 110. While not shown in FIG. 4, the magnetic head 180 may also include pads that connect to other devices in the magnetic head 180, or to provide an electrical ground, for example.

While writing to a magnetic disk 110, an electric field between the write pads 321 and 322 may be adjusted to write data. An electric current through the write sensor pads 321 and 322 in the head 180 may alter the magnetic field at the write head 412. The value of the current may depend on the value of data to be written. Different current values may generate different magnetic fields. In one embodiment, a strong magnetic field at the write head 412 may represent a logic "1", while a relatively weaker magnetic field may represent a logic "0". When placed in close proximity over a magnetic disk 110, the write head 412 may magnetize a portion of the surface of the magnetic disk 110, thereby writing data to the magnetic disk.

Read sensor 410 may be configured to sense a previously magnetized surface of a magnetic disk 110 to read data. For example, a sense current may be applied between read pads 323 and 324 and passed through the read sensor 410. A change in magnetic field near the read sensor 410 may alter the resistance of read sensor 410, thereby affecting the sense current and a voltage measurement in the read sensor 410. The voltage measurements in the read sensor may be correlated to logical values, such as, for example, logic "0" and logic "1".

FIG. 5 is a cross sectional view of an exemplary magnetic head 180, according to an embodiment of the invention. For purposes of illustration the magnetic head 180 is shown as a perpendicular magnetic head in FIG. 5. As illustrated in FIG. 5, helical coils 510 and 512 may be used to create magnetic flux in a stitch pole 508, which then delivers that flux to a main pole 506. The coils 510 may represent coils extending out from the page and the coils 512 may represent coils extending into the page. The stitch pole 508 may be recessed from the Air Bearing Surface (ABS) 518, in one embodiment. As illustrated in FIG. 5, insulation 516 may surround the coil and provide support for elements in the magnetic head 180.

Further, as illustrated in FIG. 5, the direction of media travel, as indicated by the arrow to the right of the magnetic head 180, may move the media, for example, a magnetic disk, past a lower return pole 514 first, then past the stitch pole 508, main pole 506, trailing shield 504, which may be connected to the wrap around shield (not shown), and finally past the upper return pole 302. Each of these components may have a portion in contact with the ABS 518, which extend across the right side of the structure.

Perpendicular writing may be achieved by forcing flux through the stitch pole 508 into the main pole 506 and then to the surface of the disk positioned towards the ABS 518.

FIG. 6 illustrates a piggyback magnetic head having similar features to the magnetic head illustrated in FIG. 5. Two shields 604 and 514 flank the stitch pole 508 and main pole 506. Furthermore, sensor shields 622 and 624 are illustrated. The sensor 626 may be positioned between the sensor shields 622 and 624, as illustrated in FIG. 6.

Several components of magnetic heads such as the coils 510/512 and magnetic pole layers 508/506 may be fabricated utilizing an electroplating process. The electroplating process may first involve deposition of an electrically conductive seed layer on which the component is formed. A patterned photoresist may photolithographically be fabricated upon the seed layer, and the desired magnetic head component, such as an induction coil or a magnetic pole is thereafter electroplated upon the seed layer within the patterned photoresist layer. Following the electroplating of the component, the photoresist layer is removed, followed by the portions of the seed layer that are not covered by the electroplated component. The seed layer removal step is necessary to prevent electrical shorting of the components. An ion milling step or a sputter etching step may be utilized to remove the seed layer.

The seed layer removal step may create unwanted problems in a magnetic head. For example, portions of the removed seed layer become redeposited along the sides of the electroplated components. These redeposited seed layer portions can subsequently flake off and cause unwanted electrical shorting of the components. Moreover, the ion milling or sputter etching process may also remove significant portions of the electroplated components that are exposed to it during the seed layer removal process. Therefore, the electroplated components may have to be plated up higher than would otherwise be necessary, such that after the seed layer removal process, the remaining thickness of the component is as desired.

However, even if the thickness of the component may be as desired, other dimensions of the component may be unpredictable. It is generally desirable to form components of a magnetic head with very precise dimensions. For example, it may be desirable to form the coil and or pole structures with a substantially rectangular or trapezoidal cross section. The precise dimensions may be necessary to ensure that the components have a desired electrical and/or magnetic characteristic. For example, the dimensions of the components may affect currents and/or magnetic fields associated with the components which, in turn may affect the ability of a read or write head to accurately read or write data to/from a magnetic disk.

Figure 7A:
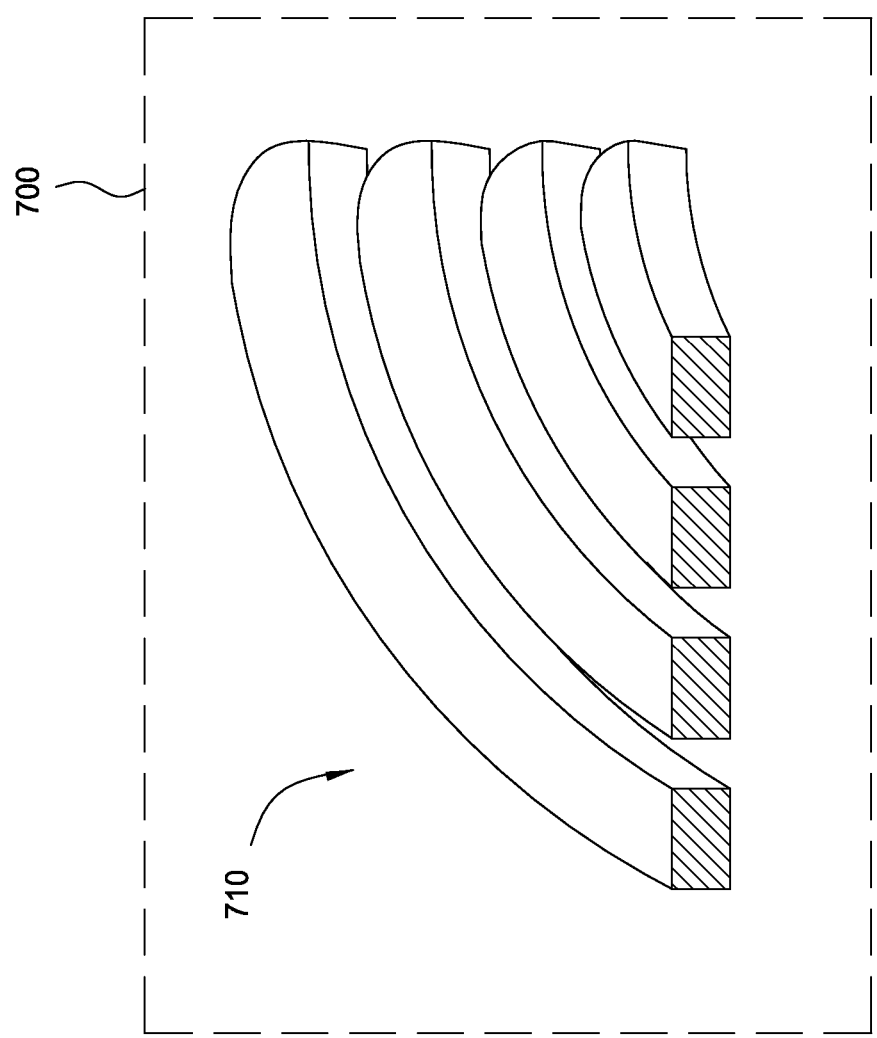
FIG. 7A illustrates a cross section of an ideal coil structure.
Figure 7B:
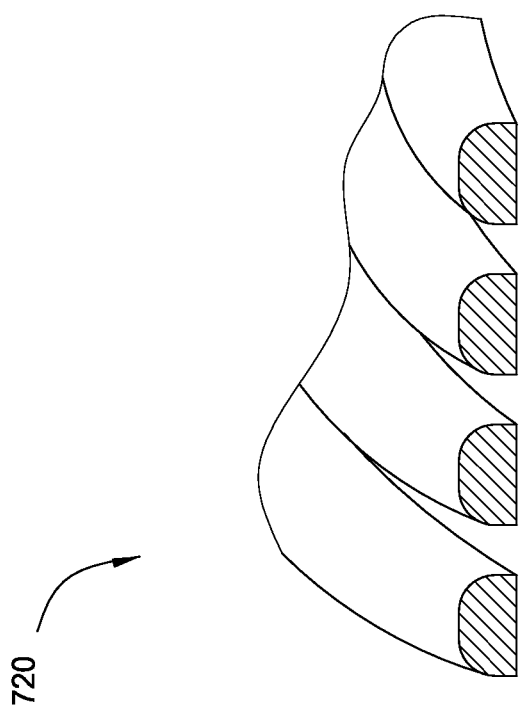
FIG. 7B illustrates a cross section of a coil structure according to the prior art.

FIG. 7A illustrates an ideal coil structure 710 with a substantially trapezoidal cross section in the plane 700. As can be seen in FIG. 7A, the edges of each coil forms substantially straight edges. As stated above, the ion milling and etching steps for removing the seed layer may also remove portions of electroplated components, which may result in the components having unpredictable shapes. FIG. 7B illustrates a coil structure 720 after an etching or ion milling step. As can be seen in FIG. 7B, each coil has rounded corners and edges. Furthermore, the shapes of the coils may vary from one coil to another, which may also be undesirable.

Furthermore, fabricating the components with an additional thickness, requires that the aspect ratio of the photoresist trenches to also be likewise increased, which may result in problems associated with the photolithographic fabrication of high aspect ratio trenches. Additionally, because it is necessary to ensure that the seed layer has been effectively removed from between the electroplated components, significant overetching is typically performed, which exacerbates the problems described hereinabove. For example, the overetching can damage layers and structures beneath the seed layer.

Figure 8:
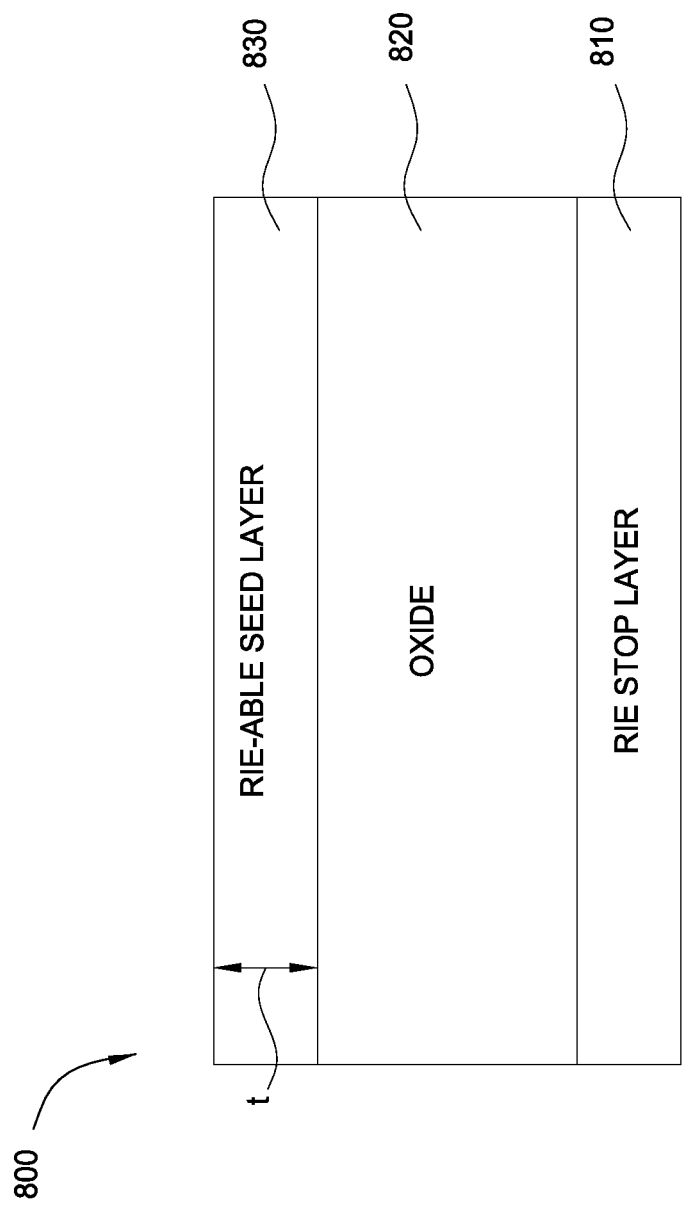
FIG. 8-14 illustrate exemplary steps for fabricating a magnetic head component according to an embodiment of the invention.

Embodiments of the invention provide a method for forming device components with precise dimensions. In one embodiment of the invention, fabrication of a magnetic head component such as, for example, a coil structure or a magnetic pole, may begin by providing substrate such as, for example, the substrate 800 illustrated in FIG. 8. As shown in FIG. 8, the substrate 800 may include a Reactive Ion Etching (RIE) stop layer 810, an oxide layer 820 formed on the RIE stop layer 810, and a RIE-able seed layer 830 formed on the oxide layer 820. While not shown in FIG. 8, in one embodiment, the RIE-able seed layer 830, oxide layer 820, and the RIE-stop layer 810 may be formed on top of a larger substrate (not shown).

In one embodiment of the invention, the substrate 800 may be used to form components of a magnetic head such as, for example, the magnetic head 180 described hereinabove. However, embodiments of the invention are not limited to fabrication of components of a magnetic head. In alternative embodiments, the substrate 800 may be used to form components in any other device such as, for example, components of integrated circuits such as processors, memories, and the like. However, for purposes of simplicity, the fabrication steps described hereinafter are generally discussed with reference to forming components of a magnetic head.

The RIE-able seed layer 830 may be formed on the oxide layer 820 using any reasonable deposition method. In one embodiment, the RIE-able seed layer 830 may be formed with a suitable material that can be removed from the substrate 800 in a subsequent Reactive Ion Etching (RIE) process. RIE generally involves using a chemically reactive plasma to remove exposed portions of a RIE-able material on a substrate. The plasma may be generated in a low pressure environment or in a vacuum. High energy ions of the plasma may attack and react with a surface of the exposed RIE-able material to form a compound that is easily removable.

In one embodiment of the invention, the RIE-able seed layer 830 may include a conductive material. In a particular embodiment, the RIE-able seed layer may be formed with a material that can be removed using a fluorine based plasma. Exemplary materials that may be used to form the RIE-able seed layer 830 may include any one of Tungsten, Titanium, Tantalum, or a combination thereof. In a particular embodiment, the RIE-able seed layer 830 may include Molybdenum. The thickness t of the RIE-able seed layer 830 may be between around 20 nm and 40 nm in one embodiment. However, in alternative embodiments the RIE-able seed layer 830 may be formed with any other desired thickness.

In one embodiment of the invention, the oxide layer 320 may include Silicon-di-Oxide ($SiO_2$). In alternative embodiments, the oxide layer 320 may include any one of $SiN_x$, SiC, sputtered carbon, $AlO_x$, a polymer material, or the like. In one embodiment, a component of, for example, a magnetic head may be formed in the oxide layer during subsequent fabrication steps, as is described below. In a particular embodiment of the invention, the thickness of the oxide layer may be between around 100 nm and 2000 nm. However, embodiments of the invention are not limited to that particular range.

The RIE stop layer 810 may be formed with a suitable material that does not react with the plasma that will be used in a RIE process to remove the RIE seed layer 830 in subsequent processing steps. For example, if a fluorine-based plasma is used to remove the RIE-able seed layer, the RIE stop layer may be formed with a material that does not react with a fluorine plasma. Exemplary materials that may be used to form the RIE stop layer may include, for example, Ruthenium, Nickel-Iron (NiFe), Nickel-Phosphide, and the like.

To form a desired magnetic head component in the oxide layer 820, the oxide layer may be patterned to form opening in a shape of the component to be formed. For example, to form a coil, the oxide layer 820 may be patterned to create an opening to form a coil structure. An opening of any reasonable shape may be patterned into the oxide layer. For exemplary purposes, the fabrication steps described hereinafter reference the formation of a trench in the oxide layer 820.

Figure 9:
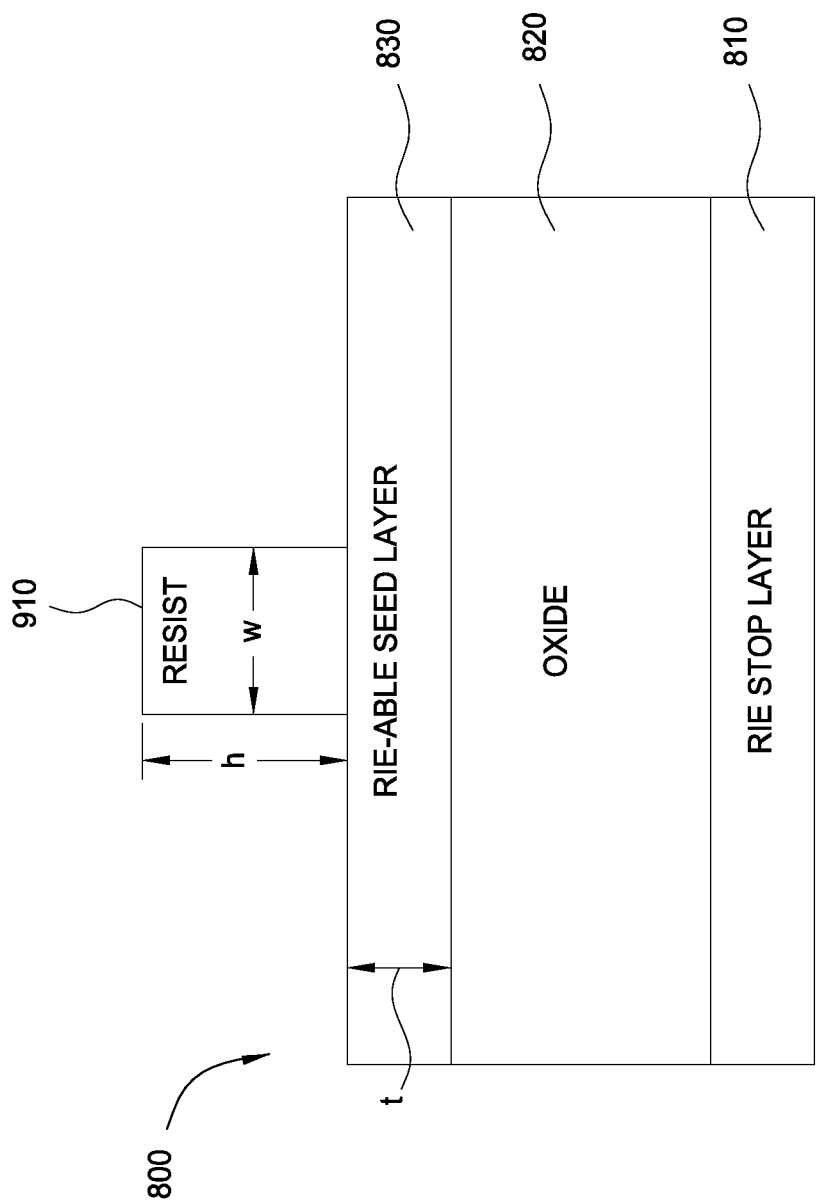

In one embodiment, a trench may be defined in the oxide layer 820 for forming a coil or a magnetic pole tip. Forming a trench may first involve patterning a resist layer over portions of the substrate 800 in which the trench will be formed. FIG. 9 illustrates a cross section of an exemplary patterned resist layer 910 formed over the substrate 800. In one embodiment of the invention, the resist layer 910 may form an elongated strip of resist material which may define the portion of the substrate under which the trench may be formed. While a single resist strip 910 is illustrated in FIG. 9, it is contemplated that a plurality of resist strips may be simultaneously formed.

The resist layer 910 may be formed using various techniques, including conventional techniques. For example, in one embodiment, forming the patterned resist layer 910 may involve depositing a layer of photoresist on the RIE-able seed layer 830 by using, for example, a spin coating method. Selective portions of the photoresist layer may be exposed to light having a predefined wavelength by using a mask. The light may cause a chemical reaction in the exposed portions of the photoresist layer. For example, the exposed portions of the photoresist layer may cause the photoresist to either harden or decompose, thereby forming a patterned resist layer 910 on the substrate.

In one embodiment of the invention, the resist layer 910 may have a width w of less than or equal to 80 nm. In some embodiments, the resist layer 910 may have a width w of less than 50 nm. In a particular embodiment, the resist layer 910 may have a width w that is at or near 50 nm. The height h of the resist layer 910 may be between around 100 nm and 200 nm. The dimensions of the height h and the width w are provided for exemplary purposes only. In alternative embodiments, the height h and the width w may have any reasonable dimension.

Figure 10:
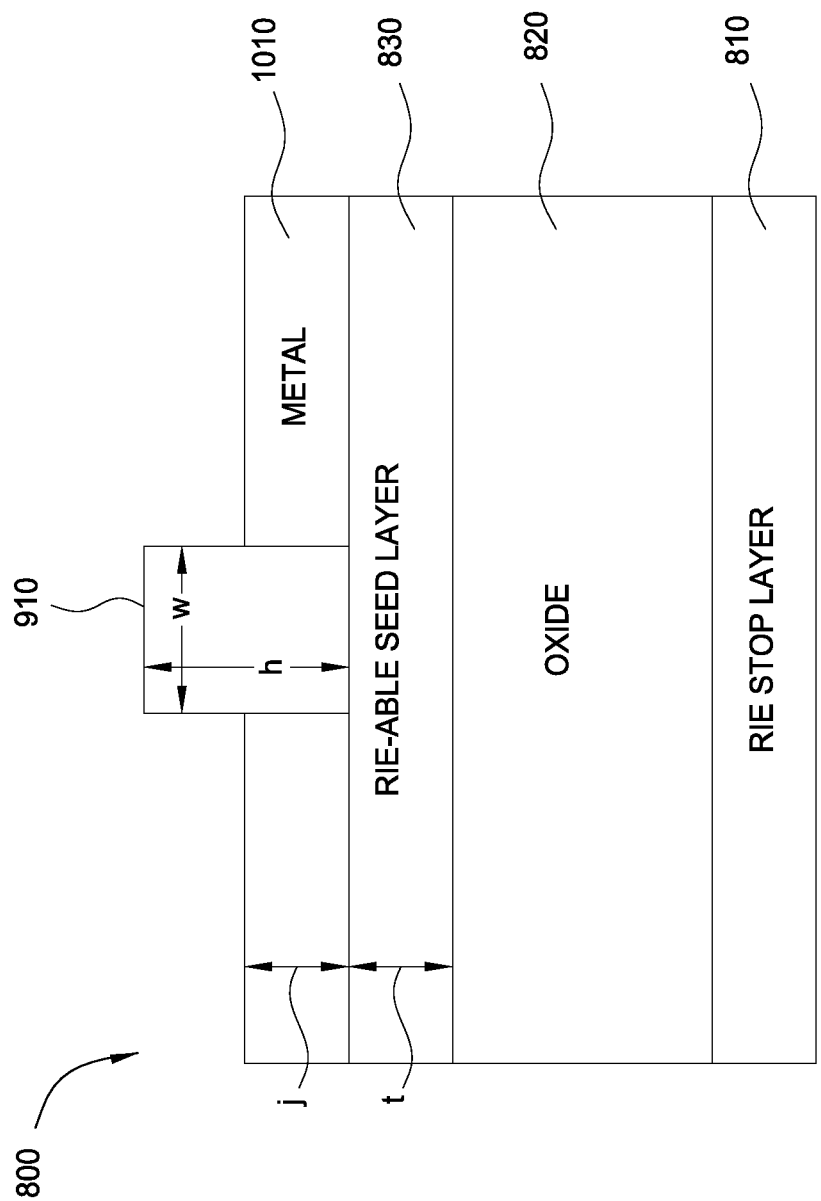

In one embodiment of the invention, after forming the resist layer 910, a metal layer may be formed on the portions of the RIE-able seed layer that are not covered by the resist layer 910. FIG. 10 illustrates an exemplary metal layer 1010 that is formed on the substrate 800, according to an embodiment of the invention. As illustrated in FIG. 10, the height j of the metal layer 1010 may be smaller than the height h of the resist layer 910. Any suitable metal may be used to form the metal layer 1010. For example, in one embodiment, the metal layer 1010 may be formed with Nickel-Iron (NiFe). In alternative embodiments, the metal layer 1010 may be formed with NiP, Ni, CoFe, Cu, or the like.

In one embodiment of the invention, the metal layer 1010 may be formed over the substrate 800 using an electroplating process. During the electroplating process, the substrate 800 (cathode) may be connected to a negative terminal of a power supply and immersed in an acidic solution. A metal (anode), for example, a metal that is to be deposited on the substrate 800, may be coupled with a positive terminal of the power supply, and immersed in the acidic solution. When the power supply is turned on, an oxidation reaction may occur at the anode and a reduction reaction may occur at the cathode (substrate), which results in the metal from the anode being deposited on the substrate 800.

Figure 11:
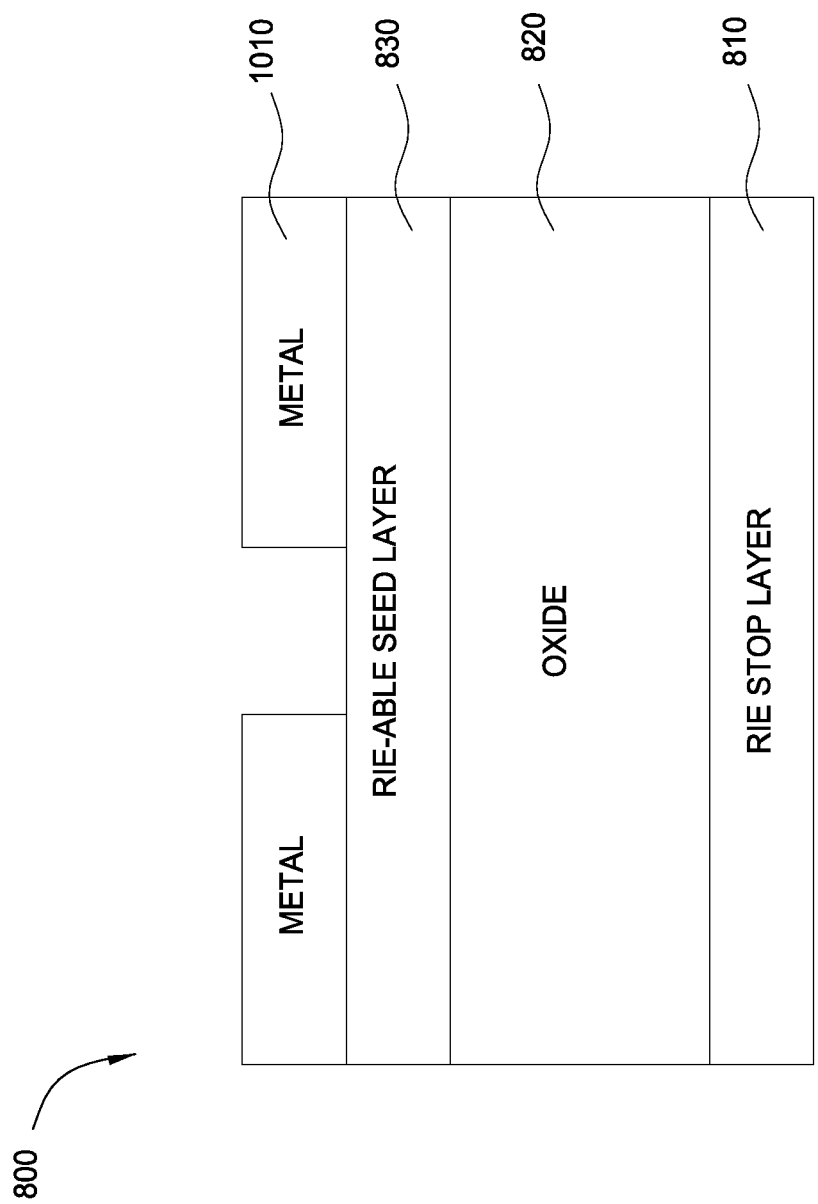

In one embodiment of the invention, after the metal layer 1010 is formed in the electroplating process, the resist layer 910 may be stripped. FIG. 11 illustrates the substrate 800 after the resist layer 910 has been stripped. As can be seen in FIG. 11, the RIE-able seed layer 830 may be exposed through the metal layer 1010.

In one embodiment of the invention, after the resist layer 910 is stripped, the surface of the substrate may be subjected to Reactive Ion Etching (RIE). During the RIE process, the exposed portion of the RIE-able seed layer 830 may be removed to expose the oxide layer. The metal layer 1010 may act as an RIE mask during the etching of the exposed portions of the RIE-able seed layer 830.

As discussed above, the RIE-able seed layer 830 may be formed with a material that is susceptible to RIE using a fluorine based plasma. For example, the some embodiments, the RIE-able seed layer 830 may be formed with tungsten or Molybdenum, which are susceptible to RIE using a fluorine based plasma. Exemplary fluorine source compounds for RIE may include $CF_4$, $CHF_3$, $SF_6$, $C_2F_6$, $C_3F_8$, or the like. During the RIE process, fluorine ions may react with RIE-able seed layer material to form a volatile gaseous fluoride. For example, tungsten may react with fluorine ions to form Tungsten Hexa-Fluoride, or alternatively, $WOF_4$. Molybdenum, on the other hand may react with fluorine ions to form Molybdenum Fluoride ($MoF_x$) or alternatively, $MoOF_4$. Because the fluoride formed during the RIE is in a volatile gaseous form, the fluoride may easily be pumped away from the substrate 800 during the RIE, thereby avoiding redeposition of the RIE-able seed layer material at other locations of the substrate.

In one embodiment, the RIE process may be continue to remove portions of the oxide layer 820 that are exposed after removal of the exposed portions of the RIE-able seed layer 830. In one embodiment, the etched product may be removed in the form of gas products such as, for example, $O_2$, $SiF_4$, or the like. For example, in one embodiment, the oxide layer 820 may be removed until the RIE stop layer 810 is exposed. As discussed above, in one embodiment, the RIE stop layer 810 may not be susceptible to the plasma used in the RIE, and therefore may not be affected by the RIE process.

Figure 12:
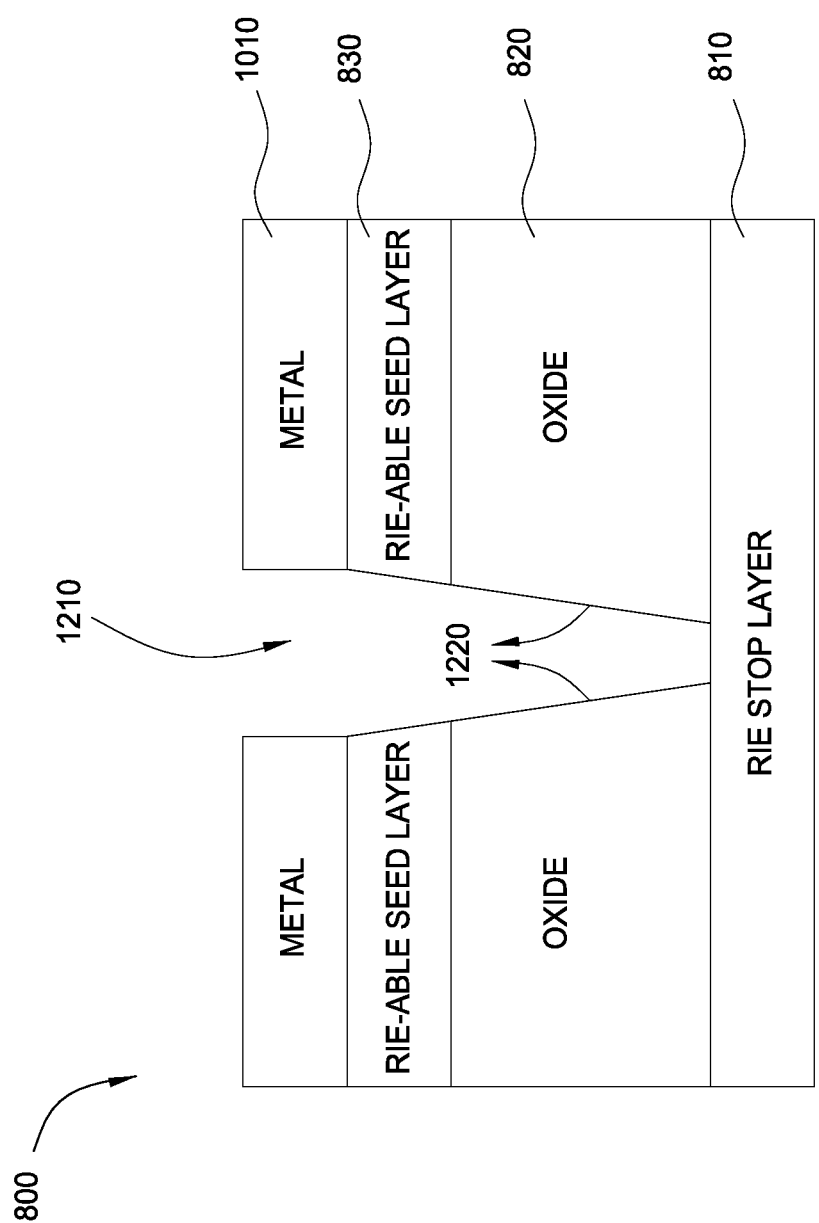

FIG. 12 illustrates an opening 1210 that is formed as a result of the RIE process. As illustrated in FIG. 12, the opening may extend from the surface of the substrate 800 to the RIE stop layer 810. Furthermore, the opening has substantially straight side walls 1220, as illustrated in FIG. 12.

In one embodiment of the invention, after the RIE process, the metal layer 1010 and the RIE-able seed layer 830 may be removed. For example, in one embodiment, the metal layer 1010 may be removed using a wet etchant that does not react with the oxide layer 820 or the RIE stop layer 810. As an example, if the metal layer is formed with NiFe, the substrate 800 may be exposed to a nitric acid solution which may remove the metal layer 1010. The RIE-able seed layer 830 may be removed by exposing the substrate 800 to a solution including a peroxide. For example, in one embodiment, a hydrogen peroxide solution may be used to remove the RIE-able seed layer. Alternative etchants that may be used include acidic chrome wet etchants such as, for example, CR-9S from Cyantek Corp. Optionally, in some embodiments, the RIE-able seed layer may not be removed. For example, in some embodiments, the RIE-able seed layer may be preserved to form one or more other components of the magnetic head.

Figure 13:
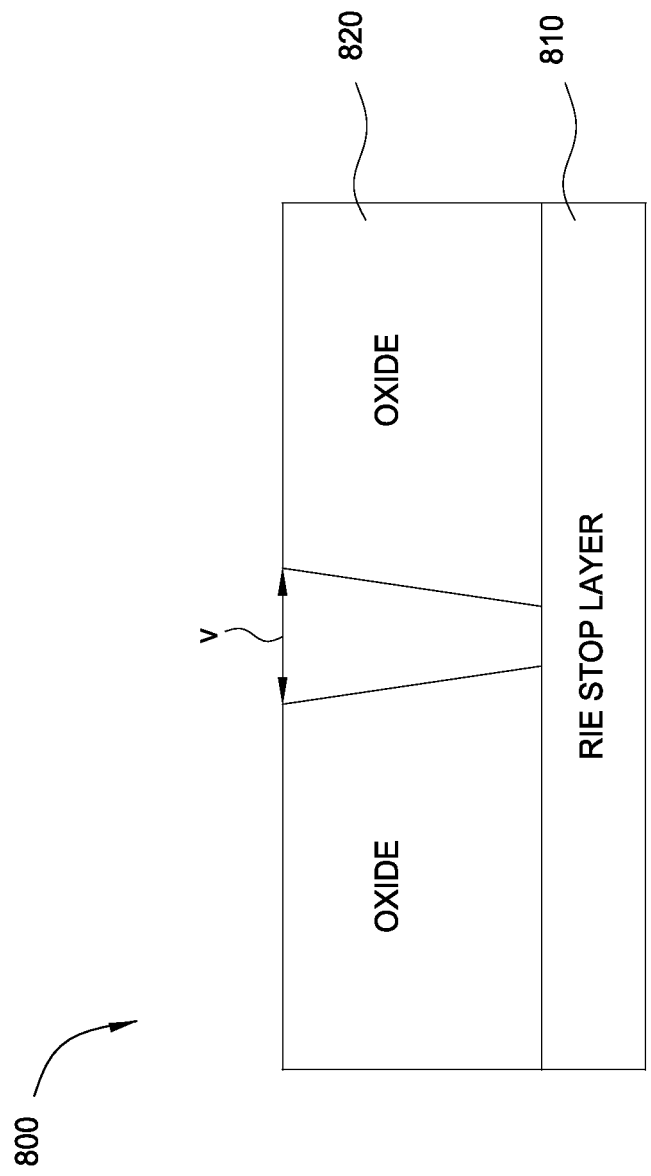

FIG. 13 illustrates the substrate 800 after the metal layer 1010 and the RIE-able seed layer have been removed. As illustrated in FIG. 13, width v of the opening in the oxide layer may correspond to a width w of the resist layer 910. In other words, an opening having desirable width v may be formed with great precision by controlling the width w of the resist layer.

After removing the metal layer 1010 and the RIE-able seed layer 830, a component of a magnetic head may be formed in the opening in the oxide layer 820. For example, a metal or a magnetic pole material may be deposited in the opening in the oxide layer 820. In one embodiment, the component material may be directly deposited in to the opening in the oxide layer 820. Alternatively, a seed layer may be deposited on exposed portions of the RIE-stop layer. Thereafter, the component material may be formed in the opening in the oxide layer in an electroplating process.

Figure 14:
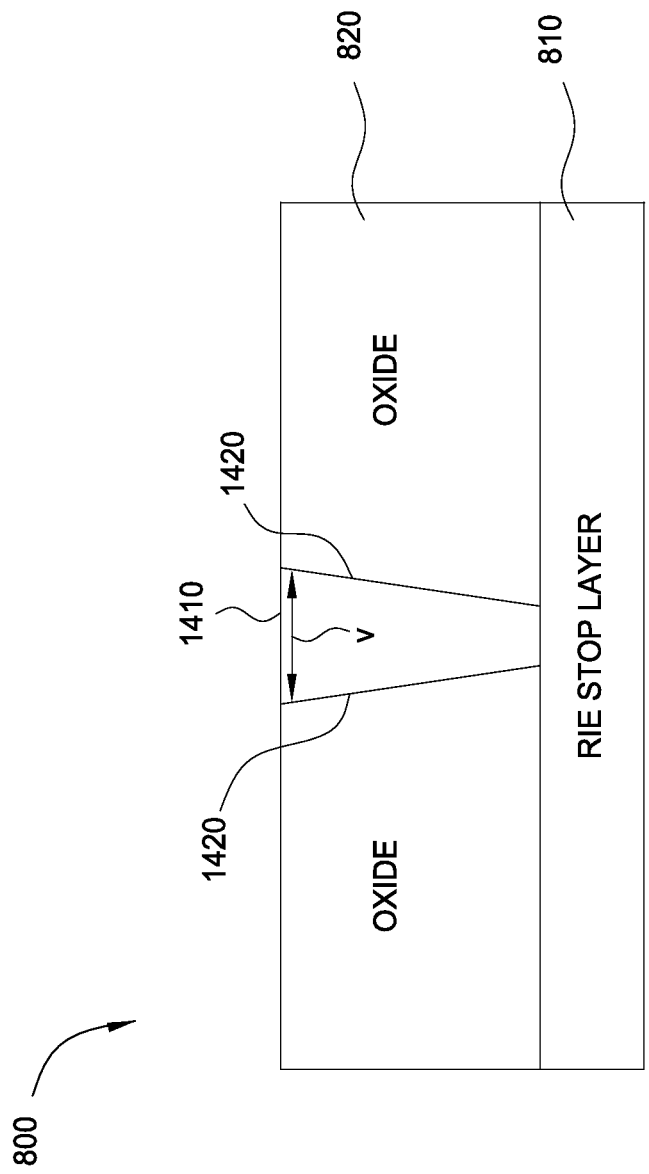

FIG. 14 illustrates a component 1410 that is formed in the opening in the oxide layer 820. As illustrated in FIG. 14, the component 1410 has a substantially trapezoidal cross section. Particularly, the sides 1420 of the component are substantially straight and connect at substantially sharp angles. In other words, the component 1410 may have dimensions that are substantially similar to dimensions of an ideal component. By allowing components to be formed with precise dimensions, embodiments of the invention may facilitate the formation of smaller, and more reliable magnetic head devices.

For example, comparing the cross section of the component 1410 to the cross section illustrated in FIG. 7B illustrated that embodiments of the invention avoid rounding of the corners of the component. This is possible because embodiments of the invention avoid exposing the component 1410 to an RIE process, thereby avoiding a loss of material from the component 1410. Furthermore, because the component material is not lost, additional component material need not be deposited to account for the loss, thereby making the fabrication of the component 1410 more efficient and less wasteful.

While the description above references formation of magnetic head components, embodiments of the invention may be advantageously used for forming components in any other type of device in which the dimensions of the component are critical. For example, embodiments of the invention may be used to form conductive traces that connect one part of an integrated circuit to another. Exemplary integrated circuits that may be formed using embodiments of the invention include processors and memories such as, for example, Dynamic Random Access Memories (DRAMs).

Figure 15:
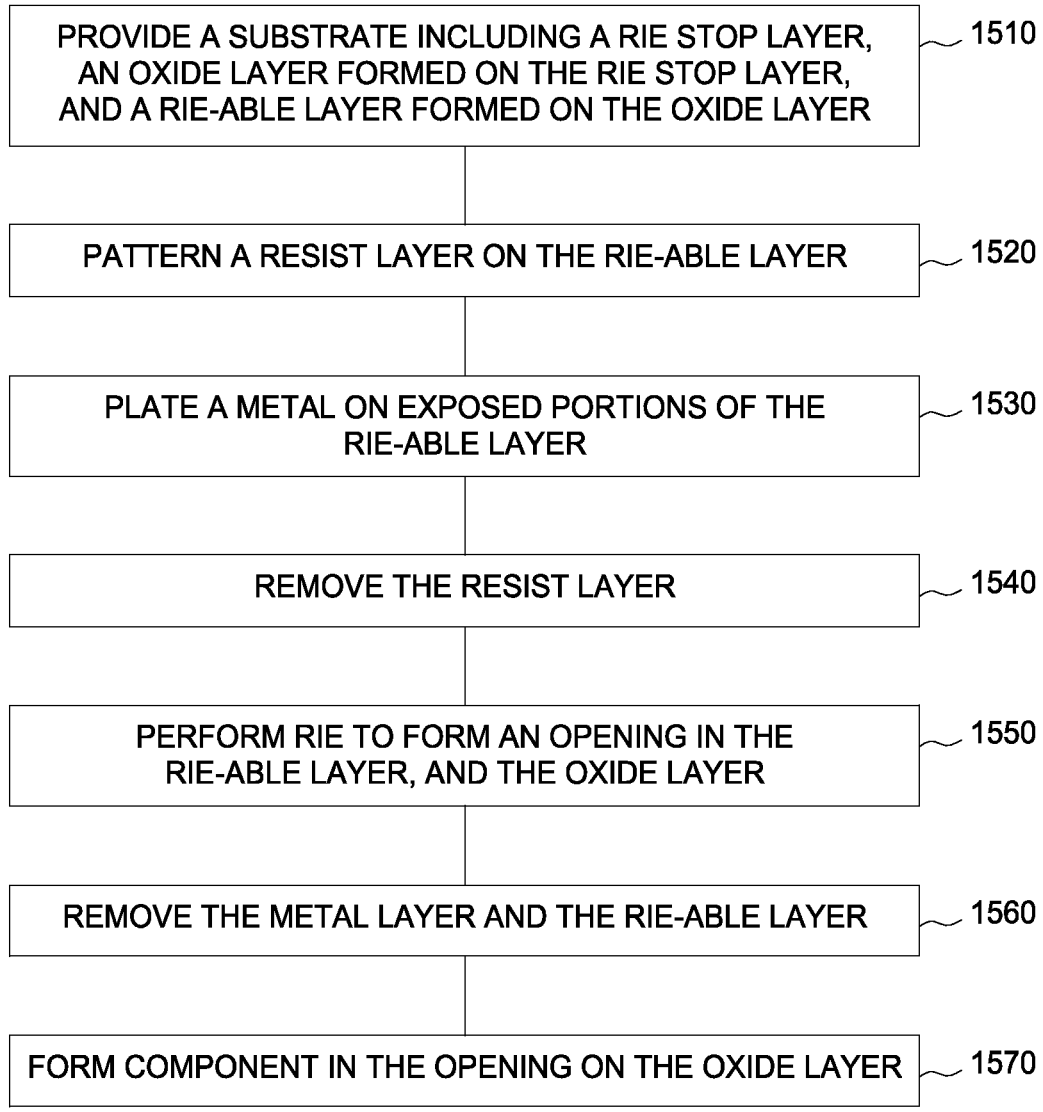
FIG. 15 is a flow diagram of exemplary operations performed to fabricate a magnetic head component according to an embodiment of the invention.

FIG. 15 is a flow diagram of exemplary operations performed to fabricate a component according to an embodiment of the invention. The operations may begin in step 1510 by providing a substrate comprising a Reactive Ion Etching stop layer, an oxide layer formed on the RIE stop layer, and a RIE-able layer formed on the oxide layer. In step 1520, a resist layer may be patterned on the RIE-able layer layer. In step 1530, a metal layer may be plated on the RIE-able layer layer. In step 1540, the resist layer may be removed. In step 1550, RIE may be performed to form an opening in the RIE-able layer and the oxide layer. In step 1560, the metal layer and the RIE-able layer may be removed. In step 1570, the component may be formed in the opening in the oxide layer.

While the foregoing is directed to embodiments of the present invention, other and further embodiments of the invention may be devised without departing from the basic scope thereof, and the scope thereof is determined by the claims that follow.

What is claimed is:

1. A method for fabricating a component, comprising:
providing a substrate comprising a Reactive Ion Etching (RIE) stop layer, an oxide layer formed on the RIE stop layer, and a Reactive Ion Etchable (RIE-able) layer formed on the oxide layer, wherein the RIE stop layer comprises any one of Aluminum, Nickel-Iron (NiFe), Nickel-Phosphide, and Ruthenium;
patterning a resist layer on the RIE-able layer;
forming a metal layer on portions of the RIE-able layer that are not covered by the resist layer via electrodeposition;
removing the resist layer, wherein removing the resist layer exposes a portion of the RIE-able layer;
performing RIE to remove exposed portions of the RIE-able layer and portions of the oxide layer beneath the exposed portions of the RIE-able layer;
removing the metal layer; and
forming the component in an opening in the oxide layer formed during the RIE.

2. The method of claim 1, wherein the RIE-able layer comprises Molybdenum.

3. The method of claim 1, wherein the oxide layer comprises silicon dioxide.

4. The method of claim 1, wherein the metal layer comprises any one of Nickel, an alloy of Iron, and an alloy of Cobalt.

5. The method of claim 1, further comprising removing remaining portions of the RIE-able layer.

6. The method of claim 1, wherein the RIE stop layer is exposed during the RIE.

7. The method of claim 1, wherein the RIE is performed using a fluorine based plasma.

8. The method of claim 1, wherein the component forms a part of an integrated circuit.

9. A method for fabricating a coil structure of a magnetic head, comprising:
providing a substrate comprising a Reactive Ion Etching (RIE) stop layer, an oxide layer formed on the RIE stop layer, and a Reactive Ion Etchable (RIE-able) layer formed on the oxide layer, wherein the RIE stop layer comprises any one of Aluminum, Nickel-Iron (NiFe), Nickel-Phosphide, and Ruthenium;
patterning a resist layer on the RIE-able layer;
forming a metal layer on portions of the RIE-able layer that are not covered by the resist layer via electrodeposition;
removing the resist layer, wherein removing the resist layer exposes a portion of the RIE-able layer;
performing RIE to remove exposed portions of the RIE-able layer and portions of the oxide layer beneath the exposed portions of the RIE-able layer;
removing the metal layer; and
depositing a metal in an opening in the oxide layer formed during the RIE, wherein the metal deposited in the opening in the oxide layer forms the coil.

10. The method of claim 9, wherein the RIE-able layer comprises Molybdenum.

11. The method of claim 9, wherein the oxide layer comprises silicon dioxide.

12. The method of claim 9, wherein the metal layer comprises any one of Nickel, an alloy of Iron, and an alloy of Cobalt.

13. The method of claim 9, further comprising removing remaining portions of the RIE-able seed layer.

14. The method of claim 9, wherein the RIE stop layer is exposed during the RIE.

15. The method of claim 9, wherein the RIE is performed using a fluorine based plasma.

16. A method for fabricating a magnetic pole of a magnetic head, comprising:
providing a substrate comprising a Reactive Ion Etching (RIE) stop layer, an oxide layer formed on the RIE stop layer, and a Reactive Ion Etchable (RIE-able) layer formed on the oxide layer, wherein the RIE stop layer comprises any one of Aluminum, Nickel-Iron (NiFe), Nickel-Phosphide, and Ruthenium;
patterning a resist layer on the RIE-able layer;
forming a metal layer on portions of the RIE-able layer that are not covered by the resist layer via electrodeposition;
removing the resist layer, wherein removing the resist layer exposes a portion of the RIE-able layer;
performing RIE to remove exposed portions of the RIE-able layer and portions of the oxide layer beneath the exposed portions of the RIE-able layer;
removing the metal layer; and
depositing a magnetic material in an opening in the oxide layer formed during the RIE, wherein the magnetic material deposited in the opening in the oxide layer forms the magnetic pole.

17. The method of claim 16, wherein the RIE-able layer comprises Molybdenum.

18. The method of claim 16, wherein the oxide layer comprises silicon dioxide.

19. The method of claim 16, wherein the metal layer comprises any one of Nickel, an alloy of Iron, and an alloy of Cobalt.

20. The method of claim 16, further comprising removing remaining portions of the RIE-able seed layer.

21. The method of claim 16, wherein the RIE stop layer is exposed during the RIE.

22. The method of claim 16, wherein the RIE is performed using a fluorine based plasma.

* * * * *